COLOR TELEVISION SIGNAL-SEPARATING SYSTEM

Filed Dec. 16, 1955 2 Sheets-Sheet 1

INVENTOR.
FRANK P. SMITH
BY
George A. Gust
ATTORNEY

COLOR TELEVISION SIGNAL-SEPARATING SYSTEM

Filed Dec. 16, 1955

2 Sheets-Sheet 2

INVENTOR.
FRANK P. SMITH
BY
George R. Gust
ATTORNEY 2,896,015
Patented July 21, 1959

2,896,015

COLOR TELEVISION SIGNAL-SEPARATING SYSTEM

Frank Patterson Smith, Fort Wayne, Ind., assignor to International Telephone and Telegraph Corporation Application December 16, 1955, Serial No. 553,532
5 Claims. (Cl. 178—5.4)

The present invention relates to a color television signal-separating system, and more particularly to a system for separating the luminance component of the composite television signal from the chrominance and sound components.

Conventional color television receivers utilize the commonly-known inter-carrier sound system whereby the video and sound signals are amplified by the intermediate frequency amplifiers and subsequently separated into the respective sound and video circuits. As is well known, the video components consist of amplitude modulated signals, whereas the sound components consist of frequency modulated signals. Inasmuch as the inter-carrier sound system is conventional, it need not be further elaborated here.

Pursuant to this invention, it is an object to utilize the inter-carrier sound system in such a manner as to improve the operation of a color television receiver and also to reduce the likelihood of inter-modulation or heterodyning which serves to produce bar or cross-hatch patterns in the picture.

It is another object of this invention to provide a signal-separating system whereby the luminance component is separated from the chrominance and signal components in such a manner as to reduce to a minimum any undesired heterodyning or inter-modulation.

It is still another object of this invention to provide a signal-separating system which is simple in construction, reliable in operation and less costly than comparable prior systems.

Other objects will become apparent as the description proceeds.

In general, the invention may comprise an intermediate frequency amplifier for amplifying a composite color television signal which consists of luminance, chrominance, and frequency modulated sound signal components, an attenuating device in the intermediate frequency amplifier for attenuating the sound component with respect to the luminance and chrominance components, an inductive take-off circuit for coupling the amplifier to separate luminance and chrominance-sound circuits, this take-off circuit being tuned to trap out the chrominance and sound components from the luminance circuit, a peaking circuit in the chrominance-sound circuit for increasing the lower frequency chrominance component with respect to the higher frequency chrominance component whereby these two components may be heterodyned to obtain individual chrominance and sound signals which may be individually utilized by subsequent circuitry. This system will be more specifically described in the following.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
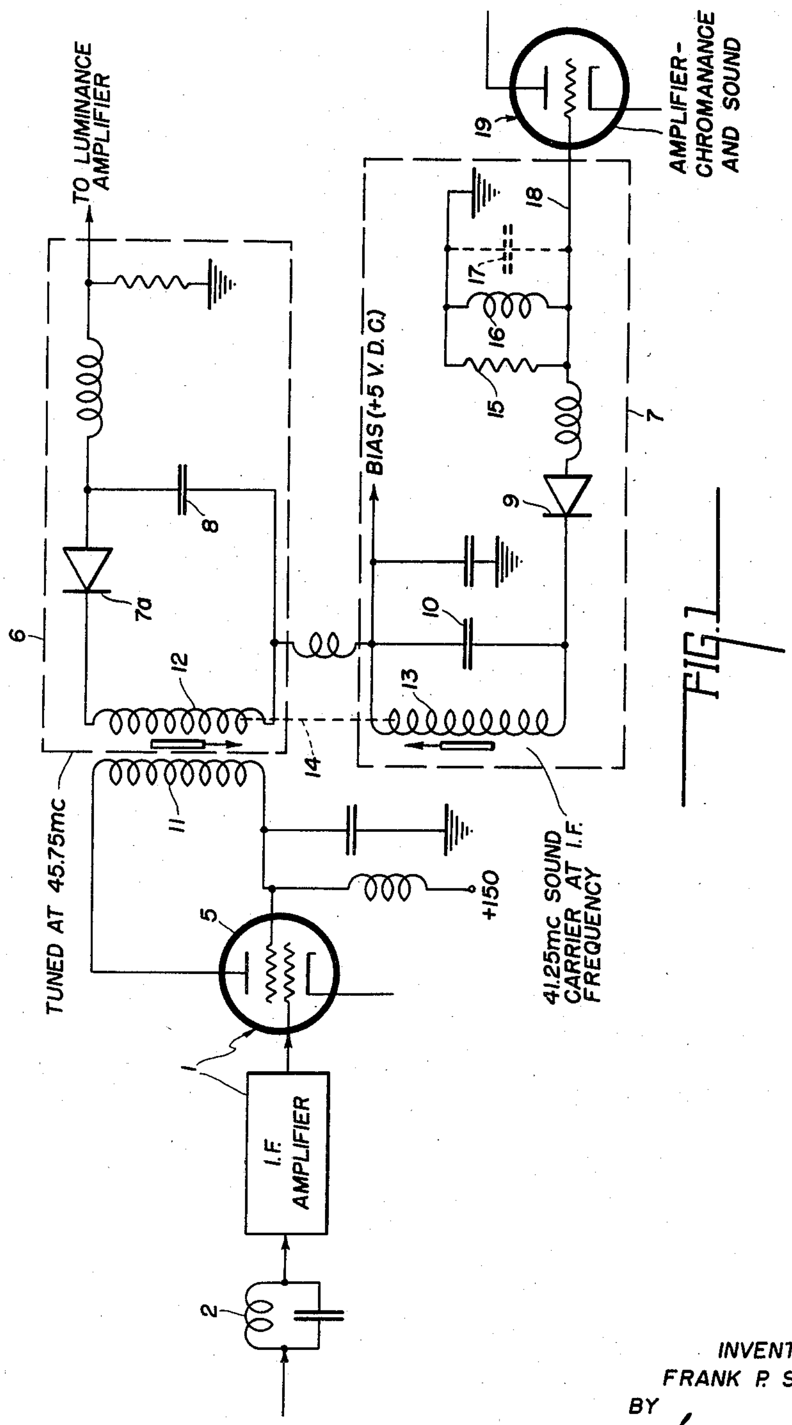
Fig. 1 is a schematic diagram of one embodiment of this invention.

Referring to the drawings, the conventional intermediate frequency amplifier, which is used in color television receivers, embodies the inter-carrier sound system as indicated by the reference numeral 1. It is, of course, obvious that the usual radio frequency, mixing and detecting circuits precede the intermediate frequency amplifier, but since these are well-known and have nothing to do with this invention, they need not be illustrated or described.

Figure 2:
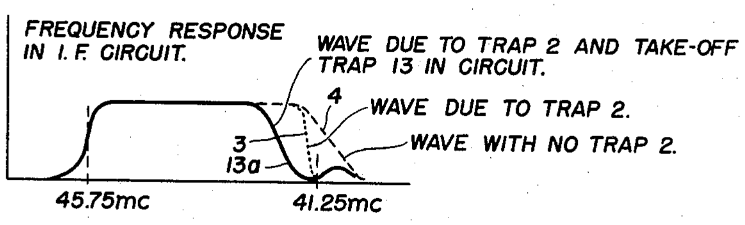
Fig. 2 is a graph of the frequency response in the intermediate frequency amplifier.

A resonant circuit or sound trap 2 is connected in the signal path of the intermediate frequency amplifier 1 either at the input end thereof or at any other point therein, as will become apparent from the following description. As is well-known, the composite color television signal consists of luminance, chrominance and sound signal components, the luminance and chrominance components being amplitude modulated signals, whereas the sound component is a frequency modulated signal. All of these signals are spaced in the frequency spectrum in accordance with the well-known NTSC standards. The sound trap 2 is tuned to the frequency of the sound component for attenuating this component with respect to the video signal. Thus, the frequency response of the intermediate frequency amplifier will correspond to the dotted-line graph of Fig. 2, which is indicated by the reference numeral 3. By contrast, if the trap 2 is eliminated the frequency response of the intermediate frequency amplifier would correspond to the dashed line graph 4. Since the sound carrier is conventionally at 41.25 megacycles, it will be seen in this graph that the sound signal is severely attenuated with respect to the luminance and chrominance components, and since this has an important bearing on the invention, it will be explained more fully in the following.

Referring again to Fig. 1, the final stage 5 of the intermediate frequency amplifier 1 is coupled to two individual circuits, a luminance circuit 6 and a chrominance circuit 7. These two circuits 6 and 7 are indicated as lying within the dashed line rectangles.

The luminance circuit 6 consists of a crystal detector *7a* and a diode filter capacitor 8 while the chrominance sound circuit 7 is composed of a crystal detector 9 and a tuning capacitor 10. The other portions of these two circuits will be explained in more detail.

The two circuits 6 and 7 are coupled to the amplifier stage 5 by means of an inductive coupling composed of a primary winding 11 and two secondary windings 12 and 13. The two windings 11 and 12 are very closely coupled and preferably are bifilar windings, whereas the winding 13 is very loosely coupled with respect to the windings 11 and 12 as indicated by the dashed line 14. The winding 12 is tuned to some frequency of the luminance component which may be, for example, 45.75 megacycles, whereas the winding 13 is tuned to the frequency of the sound component which is 41.25 megacycles. By reason of the inter-action between the windings 12 and 13, the sound signal is effectually trapped out of the luminance circuit 6, thereby further attenuating the sound signal in the luminance circuit 6 with respect to the luminance signal, as graphically illustrated by the solid-line curve *13a* of Fig. 2. This is extremely important, because the greater the ratio between the luminance and sound components, the less chance there is of inter-modulation or beating which will produce the conventionally recognized bars or cross-hatching in the picture corresponding to 920 kilocycle beats. It will be noted that this particular beat frequency is derived by the heterodyning of the 4.5 megacycle sound signal with the 3.58 megacycle chrominance signal.

By reason of the attenuation of the sound signal first in the intermediate frequency stages 1 and lastly in the luminance circuit 6, it is thus seen that little or no difficulty can be experienced in materially reducing or eliminating the objectionable 920 kilocycle beat signal or any other inter-modulation effects produced between the sound signal and the video signals. It is important to note that this extreme attenuation of the sound signal in the luminance circuit 6 is achieved without the use of any special sound traps in the luminance circuit 6 itself. The winding 13 effectually serves this purpose.

While the winding 13 serves as the sound trap, it provides a second important function of supplying chrominance and sound signals to the circuit 7, as will now be explained. Again by reason of the inductive interaction between the windings 12 and 13, the luminance signals are attenuated from the chrominance sound circuit 7. The winding 13 and condenser 10 have a frequency response which is limited essentially to the sound carrier frequency, but it also passes frequencies in the neighborhood of plus or minus 1.5 megacycles at 6 decibels so that the customary chrominance signals having a center frequency of 3.58 megacycles may be introduced into the chrominance-sound circuit 7. Inasmuch as the trap 10, 13 is peaked at the sound carrier frequency, and the sound carrier rises in amplitude with respect to the chrominance component, the ratio between the amplitudes of the sound and chrominance components will correspondingly increase, and at this point it should be noted that this increase is in a direction to overcome the attenuating effects which the trap 2 has on the sound carrier in the intermediate frequency amplifier circuits. In other words, it will be recalled that the sound carrier was attenuated in the intermediate frequency stages 1. This attenuating effect is reversed by means of the trap circuit 10, 13 which serves to increase the sound signal with respect to the chrominance signal. The amount of this increase which is needed and desired will now be explained.

It is well understood that the ratio between the video and sound signals in an inter-carrier sound system just prior to detection by the sound detector should be in the neighborhood of 26 to 32 decibels, whereby heterodyning of the frequency modulated signal at its relatively low amplitude with the amplitude modulated video signals will result in the production of a 4.5 megacycle sound signal having negligible amplitude modulated video components therein. Thus, the video and sound signals are effectively separated.

In the present instance, the relationship between the luminance and sound signals in the chrominance-sound circuit 7 should be in the ratio of 30 to 1 decibels in order to achieve optimum operation of the subsequent sound circuits.

From this, it may now be seen that the degrees of attenuation and peaking as achieved by the various traps 2, 12 and 13 should be so proportioned that the optimum ratio of luminance-to-sound signals in the chrominance-sound circuit 7 should be such as to result in providing the 30 to 1 decibel ratio just mentioned.

Figure 3:
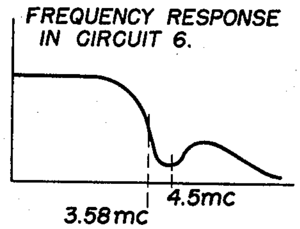
Fig. 3 is a graph of the frequency response in the luminance circuit.
Figure 4:
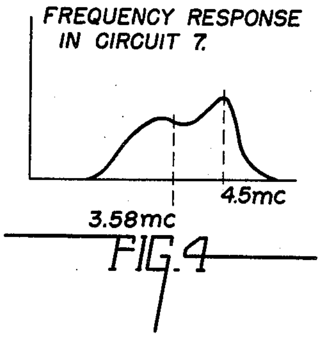
Fig. 4 is a graph of the frequency response in the chrominance-sound circuit.

Fig. 3 illustrates the frequency response of the luminance circuit 6, it being noted that the sound signal occurring at 4.5 megacycles is sharply attenuated. In Fig. 4 is illustrated the frequency response of the chrominance-sound circuit 7, it being noted that the sound frequency is peaked with respect to the luminance frequency.

Returning to Fig. 1, a peaking circuit composed of a resistor 15 in shunt with inductance 16 and stray capacitance 17 provides peaking in the region of the chrominance signal to produce an overall frequency response in the circuit 7 which is common to both sound and chrominance components which may be separated and utilized by later circuitry.

The parameters of this peaking circuit 15, 16, 17 are so selected as to effectively short circuit any luminance components which may have been passed by the detector 9; thus it is noted that while the circuit 7 serves to properly proportion the luminance and sound components with respect to each other, it also serves to further reject and minimize any of the low frequency luminance signals which may have passed thereinto.

The output circuit of the circuit 7 is indicated by the reference numeral 18 and provides both chrominance and sound signals which may thereupon be amplified and later separated by subsequent circuitry as indicated by the reference numeral 19.

The relatively pure luminance signal derived from the circuit 6 is of course utilized in the conventional manner.

Recapitulating briefly, by reason of the particular arrangement of attenuating and peaking circuits, intermodulation or beating effects involving the sound signal are effectively minimized or eliminated. This minimizing of the intermodulation not only occurs in the luminance circuit 6 but also in the intermediate frequency stages 1. The peaking coil load 15, 16, 17 for the chrominance detector 9 effectively prevents low frequency luminance components from being introduced into the output circuit 18. The frequency response in the chrominance-sound circuit 7 provides a rise in the ratio of sound-to-video carriers for attaining the necessary amplitude relationship therebetween for efficient detecting purposes, as has already been explained. In the final analysis, the signals derived from the respective circuits 6 and 7 are pure and possess fewer undesired beats than has been possible heretofore.

While I have described above the principles of my invention in connection with specific apparatus, it is to be clearly understood that this description is made only by way of example and not as a limitation to the scope of my invention.

What is claimed is:

1. A system of the character described comprising first means for amplifying a composite color television signal consisting of luminance, chrominance and sound signal components, second means for attenuating the sound signal component of the composite signal which is amplified by said first means, a first luminance signal circuit, a second chrominance-sound signal circuit, third means intercoupling said first means with said first and second signal circuits, said third means comprising signal-separating means which limits the luminance portion of the composite signal to said luminance circuit only and the chrominance and sound signal components of said composite signal to said chrominance-sound circuit only, and sound signal-peaking means included in said signal-separating means for increasing the ratio of the sound signal to the luminance signal in said second chrominance-sound circuit.

2. A system of the character described comprising first means for amplifying a composite color television signal consisting of luminance, chrominance and sound signal components, second means for attenuating the sound signal component of the composite signal which is amplified by said first means, a luminance signal circuit, a chrominance-sound signal circuit, third means intercoupling said first means with both of the last-mentioned signal circuits, said third means comprising signal-separating means which limits the luminance portion of the composite signal to said luminance circuit only and the chrominance-sound portion of said composite signal to said chrominance-sound circuit only, sound signal-peaking means included in said signal-separating means for increasing the ratio of the sound signal to the luminance signal in the chrominance-sound circuit, and a heterodyning circuit included in said chrominance-sound circuit for heterodyning said luminance and sound signals together.

3. A system of the character described comprising first means for amplifying a composite color television signal consisting of luminance, chrominance and sound signal components, second means for attenuating the sound signal component of the composite signal which is amplified by said first means, a first luminance signal circuit, a second chrominance-sound signal circuit, an inductive coupling interconnecting said first means and said first and second signal circuit, said inductive coupling including two tuned circuits which are tuned to the frequencies of said luminance and said sound signals respectively, and peaking means in said chrominance-sound circuit for increasing the ratio of the sound-to-luminance signal amplitudes.

4. A system of the character described comprising an intermediate frequency amplifier for amplifying a composite color television signal consisting of luminance, chrominance and sound signal components, attenuating means for attenuating the sound component with respect to the luminance component, a signal-separating circuit coupled to said amplifier for separating the luminance component from the remaining components, a luminance circuit coupled to said signal-separating circuit for utilizing said luminance component, a chrominance-sound circuit also coupled to said signal separating circuit for utilizing the chrominance and sound components, peaking means in said chrominance-sound circuit for increasing the amplitude of the sound component with respect to the luminance component, and a detecting circuit included in said chrominance-sound circuit for heterodyning the luminance and sound components, the ratio of the amplitudes of luminance, chrominance and sound components as affected by said peaking means being such that the heterodyned signal will be composed of separable sound and chrominance components which may be individually utilized by subsequent circuitry.

5. A system of the character comprising an intermediate frequency amplifier for amplifying a composite color television signal consisting of luminance, chrominance and sound signal components, attenuating means for attenuating the sound component with respect to the luminance component, a luminance circuit, a chrominance-sound circuit, a tuned inductive circuit coupling said amplifier to said luminance circuit and said chrominance-sound circuit, said inductive circuit comprising a primary and first and second secondary windings, said first winding being tuned to the frequency of the luminance component for rejecting the sound component, said second winding being tuned to the frequency of the sound component for attenuating still further the sound component which is coupled to the luminance circuit, said second winding rejecting the luminance component but passing the chrominance and sound components, said second winding also serving to increase the sound component with respect to the luminance component and a detecting circuit in said chrominance-sound circuit for heterodyning the luminance and sound component thereby providing both chrominance and sound signal components which may be separately utilized by subsequent circuitry.

References Cited in the file of this patent

UNITED STATES PATENTS 2,770,673 Creamer -------------- Nov. 13, 1956

OTHER REFERENCES

Color TV, Rider Pub., March 1954, pages 141 and 142. (Copy in Div. 16.)

Color TV, Admiral Pub., February 1954, page 36, copy in Div. 16.

RCA Color Television Receiver, Model CT-100, March 1954, pages 31 and 32. (Copy in Div. 41.)